April 10, 1962

B. B. REILLY 3,028,854

SPACE HEATER

Filed Dec. 30, 1957

INVENTOR.
BERTRAM B. REILLY.
BY Christy, Parmelee & Strickland
ATTORNEYS.

United States Patent Office 3,028,854
Patented Apr. 10, 1962

3,028,854
SPACE HEATER
Bertram B. Reilly, Pittsburgh, Pa., assignor to Dravo Corporation, Pittsburgh, Pa., a corporation of Pennsylvania
Filed Dec. 30, 1957, Ser. No. 705,835
7 Claims. (Cl. 126—110)

The present invention is concerned generally with space heaters of large capacity used in industrial establishments and more specifically with the combustion chamber and heat exchanger of such space heaters, in their relation to the forced circulation of air to be heated by passage thereover.

Industrial space heaters of the type herein described are used to heat large areas in industrial manufacturing buildings under the adverse conditions existing in such buildings. Such heaters may be used with ducts conveying heated air to various portions of the building, but are generally used without ducts.

The heater of the invention is designed as a self-contained unit which is moved to a site and erected as a unit. The same heater may be mounted upon the building floor or in suspended position, and may be disposed in upright, inverted or horizontal positions to meet service needs. The heating capacity of such heaters is large, ranging from several hundred thousand to as much as 2,000,000 B.t.u. per hour. This heat may be supplied continuously over long periods or intermittently, and must reach capacity in a relatively short period of time.

By reason of the large volume of heating air delivered by the heater during a given unit of time and the desirability of maintaining the smallest economical size of heater, for a given capacity, special problems are encountered in extracting heat from the combustion chamber and heat exchanger and in providing suitable passageways through the heater to handle the volume of air required. The solutions to these problems are provided by details of construction and arrangement of the combustion chamber and heat exchanger herein, to the casing walls defining the space wherein such members are disposed.

One object of the invention is to provide a combustion chamber of suitable construction and contour providing adequate heat transfer surfaces of substantially uniform temperature throughout any cross sectional area thereof and facilitating heating of the air flowing therepast by both conduction and radiation.

Another object of the invention is to provide a novel form of heat exchanger disposed in novel relation to the combustion chamber, facilitating rapid extraction of heat therefrom by the large volumes of air flowing therepast.

A further object of the invention is to provide a novel form of casing defining the passageway through which the air flows through the heater and the relation of said passageway to the combustion chamber, heat exchanger and air discharge and directional outlet.

This application is a continuation-in-part of my co-pending application Serial No. 568,042, filed February 27, 1956, now Patent No. 2,836,169.

These and other objects will be made apparent from the following disclosure and the drawings forming a part thereof, wherein:

FIG. 1 shows an isometric view of the space heater with portions of the casing broken away to show details of construction;

FIG. 5 shows a section through the heater on lines V—V of FIG. 4;

FIG. 6 shows a plan view of the heat exchanger illustrating flow of combustion gases therethrough; and FIG. 7 shows a cross section through a portion of the wall thereof and the corrugations therein.

Figure 4:
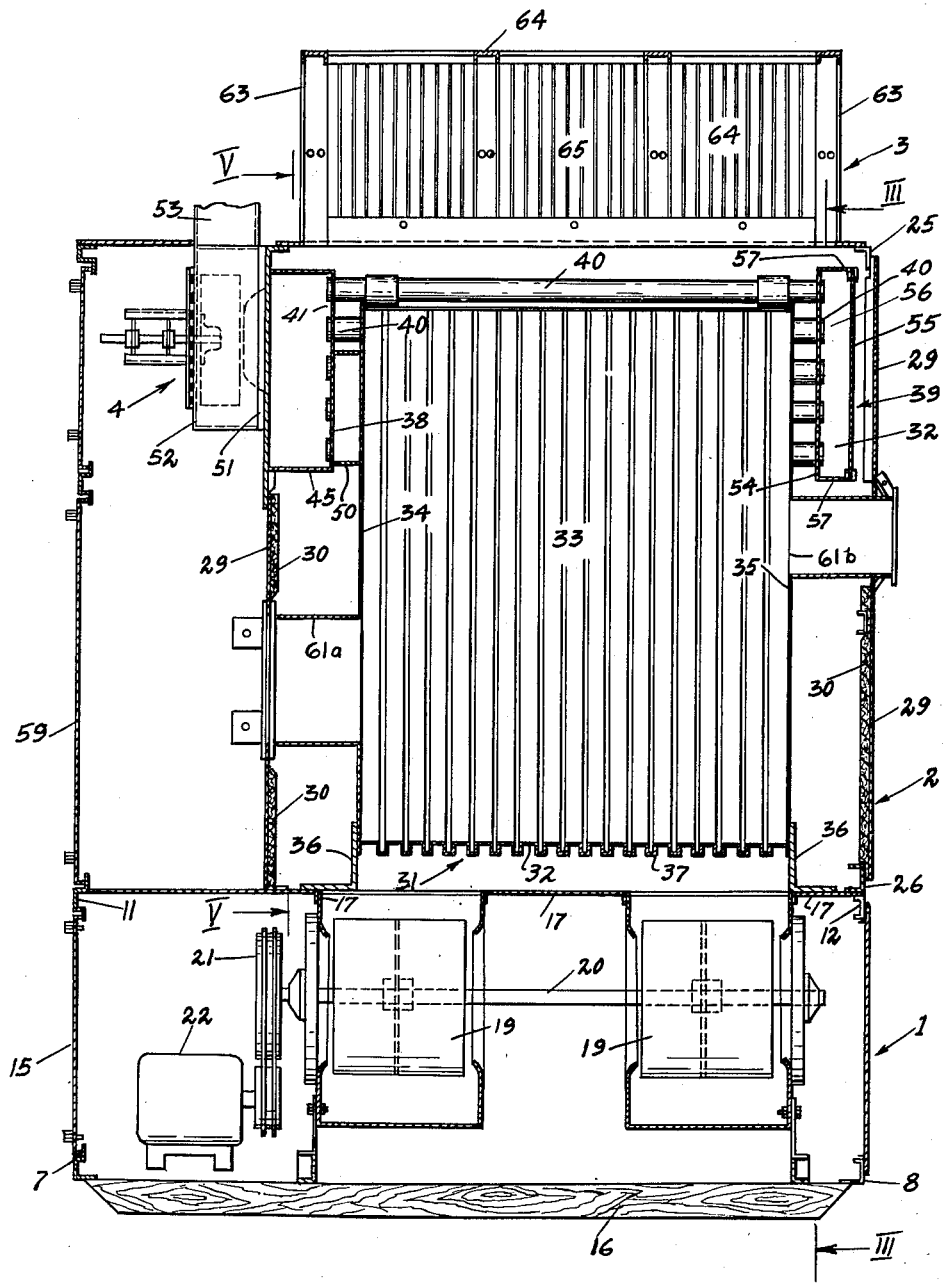
FIG. 4 shows a cross section through the heater on a longitudinal center line through FIG. 1.

Referring now in general to the heater as best disclosed in FIGS. 1 and 4 of the drawings, it comprises a blower section 1, air heating section 2, air discharge section 3 and combustion gas exhaust section 4. The heater is disposed for use in upright position as shown in FIG. 1. It will, however, function equally well when disposed horizontally and may be suspended in inverted position to suit requirements or convenience. Since the heater is designed to be supplied in a variety of capacities, the relative sizes of its component parts will vary in dimensions, but the arrangement of sections 1 to 4 will preferably remain the same. The exact details of the framing and casing of the heater is a matter of design, except for its functional parts, and as a matter of convenience the casing details are shown as in the sections referred to.

The Blower Section

The blower section 1 is so related to the air heating and discharge sections 2 and 3, that the air blows directly upward against the combustion chamber, through air heating section 2 and out discharge section 3. This relation is maintained even though the heater is disposed horizontally or inverted. Section 1 is shown as equipped with two fans, the number of fans employed may be one or more depending upon the rated capacity of the heater.

Blower section 1 comprises a frame having suitable longitudinal members 5 and 6 connected by suitable transverse members 7 and 8, suitable upper longitudinal members 9 and 10 connected by suitable transverse members 11 and 12, and the upper and lower members are connected by suitable uprights 13. Suitable end and side sheets are applied to the frame, and the side sheets are preferably comprised of expanded metal screen 14 admitting air into the section 1. The end sheets 15 may be solid sheets or screen as desired, the sheets 15 being shown as solid sheets. At one end wall, the sheets 15 may be hinged or detachably connected to the frame to provide access to the interior of the section 1. The frame members 5 and 6 may rest directly upon the floor or other support, and are shown as mounted on wooden blocks 16 for convenience in handling. The upper face of section 1 is closed by a baffle plate 17 of any suitable construction and is provided with suitable openings 18 therein through which fans 19 discharge the air to be heated. Two such fans 19 are shown and are preferably mounted on a single shaft 20 driven by a suitable pulley and belt assembly 21 which in turn is driven by a suitable motor 22. The fans, shaft 20 and motor may be secured in place by suitable supports as indicated.

The Air Heating Section

Figure 2:
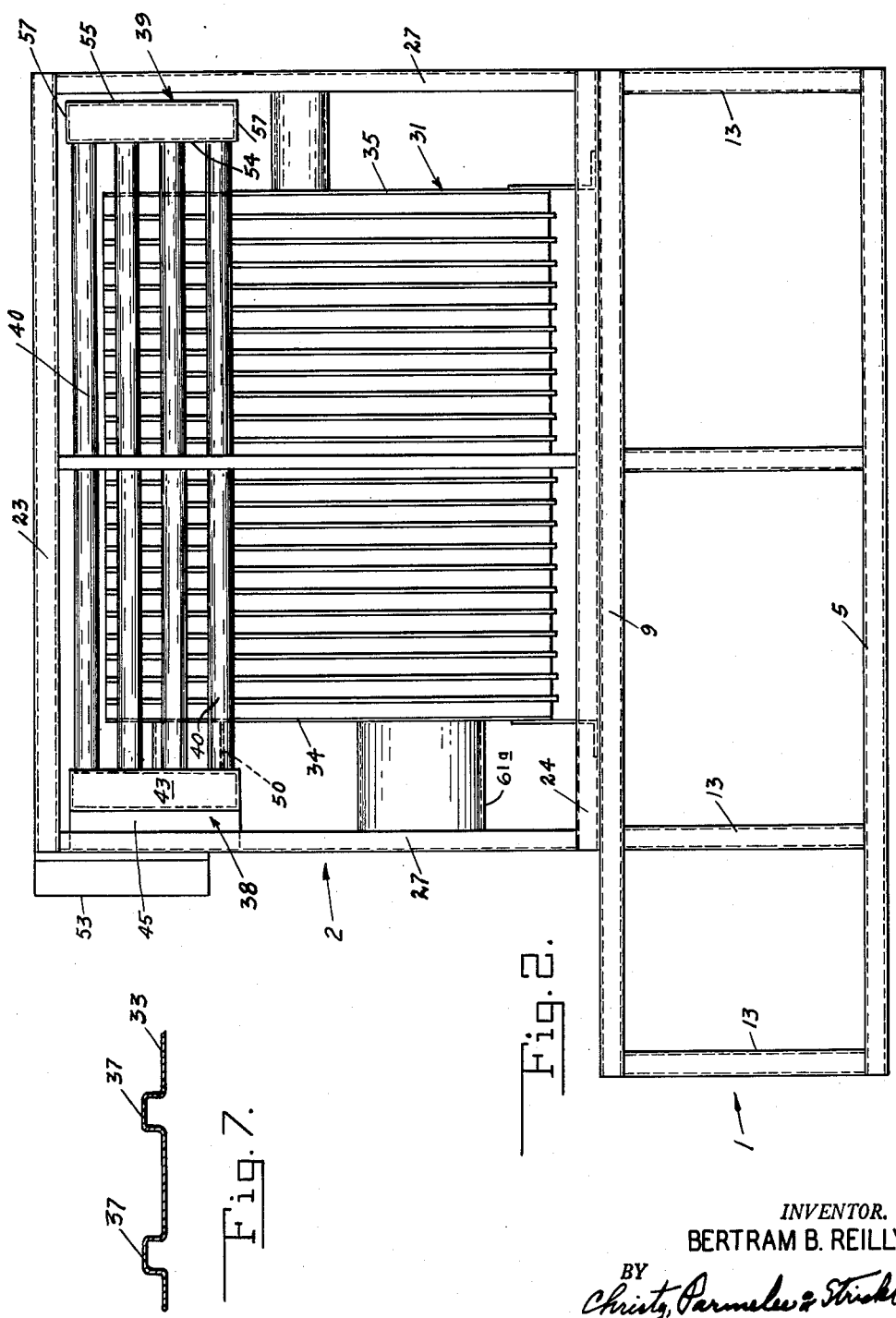
FIG. 2 shows the casing framing members supporting the combustion chamber and heat exchanger.
Figure 3:
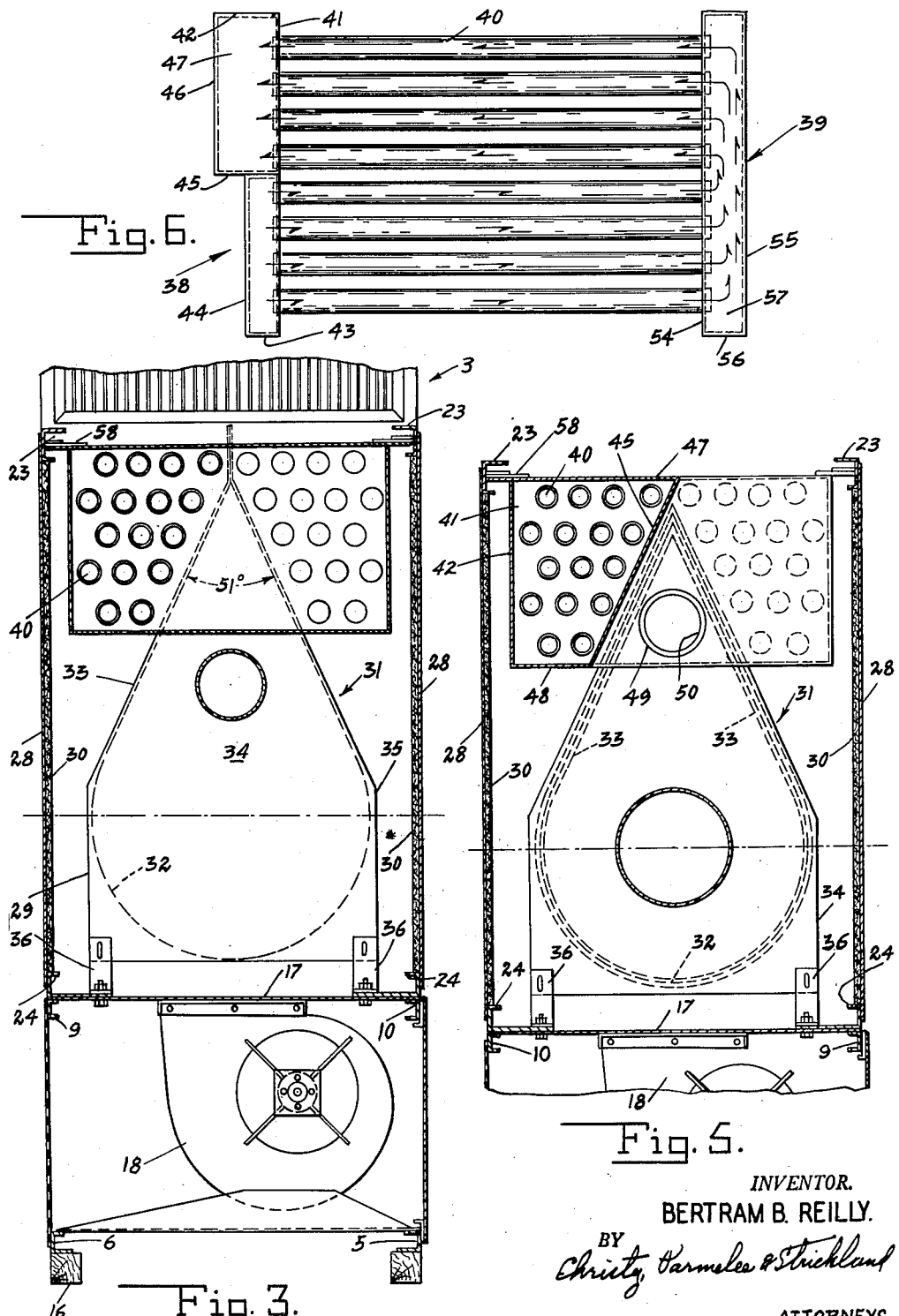
FIG. 3 shows a cross section through the heater on lines III—III of FIG. 4 illustrating the relation of the combustion chamber and heat exchanger.

The air heating section 2 is best shown in FIGS. 1 to 5 inclusive. The main frame of section 2, housing the combustion chamber and heat exchanger, is comprised of spaced top and bottom longitudinal members 23 and 24, connected by transverse members 25 and 26, and supported in spaced relation by uprights 27. This frame is supported on section 1, as shown in FIG. 2, and suitably connected thereto. The frame so described is enclosed by solid side and end wall panels 28 and 29 suitably secured thereto as shown in FIGS. 3 and 5 forming a substantially rectangular casing. Each wall panel 28 and 29 has attached to the inner face thereof a suitable insulation panel 30 which is preferably fiberglass, but may be of any other suitable insulating material.

Within section 2 is mounted the combustion chamber 31 disposed in spaced relation to the side and end walls 28 and 29. Said chamber 31 is comprised of a substantially semi-circular bottom wall 32, converging connected side walls 33 extending upwardly therefrom and end walls 34 and 35 connecting the side and bottom walls forming a closed chamber. Chamber 31 is suitably supported in spaced relation to the baffle pan 17. As best shown in FIGS. 3 and 5 a preferred form of combustion chamber end plate and support comprises forming end walls 34 and 35 so as to slightly overlap the side walls 33 and forming the bottom portion of the end walls substantially rectangular. End wall 34 has a suitable opening therein for a combustion burner collar 61a and end wall 35 may be provided with opening 61b to serve as a peep-hole. The side walls 33 may then be butt welded to the end walls, and the end walls connected by angle clips 36 to the baffle plate 17.

As shown in FIGS. 3, 4 and 5 the combustion chamber is disposed in sufficient spaced relation to the adjacent walls 28, 29 of section 2 in order to accommodate the required volume of air being blown over and past the combustion chamber. The combustion chamber side walls are formed to provide an included angle of about 51° at the top of the chamber. When so constructed the minimum cross sectional area for passage of heating air between the combustion chamber side walls and the insulation panels 30 is at the point of tangency with the chamber bottom wall, and the chamber bottom wall 32 curves smoothly inwardly to the point of tangency with the side wall. The air moving past the combustion chamber 31 is therefore progressively compressed up to said point of tangency and progressively expands thereabove. Thus the smooth curve of the bottom wall into the chamber side wall induces flow of the expanding air upwardly along the surface of the side walls of the chamber and extracts heat therefrom by conduction. The volume expansion of the air provides transverse movement thereof between chamber and casing facilitating heating of the air by radiation from the chamber walls and the casing walls.

An included angle of about 51° between the connecting converging side walls is considered to be an optimum angle in obtaining flow of the expanding air into wiping engagement with the surface of the chamber sidewalls. The temperature of the chamber sidewalls, due to the burning fuel, is at an approximate maximum of 1,000° F. There is therefore great advantage in having the air flowing past the chamber side walls scrubbing the sidewalls in removing heat therefrom. Due to the volume of air flowing past the chamber, due to the high rated capacity in relation to size of the heater, the air must be heated by enhanced conduction in the presence of relatively turbulent flow. Flow of heat into the air is aided by the progressively expanding cross-sectional area of the space above line A (FIG. 3). The expanding volume of air filling this space prevents stratification of air flow and this increases the rate of heat absorption by the air through convection.

The manner of corrugating the side and bottom walls of the combustion chamber contributes greatly to the uniform extraction of heat therefrom and prevents destruction of the metal by hot spots. The combustion chamber of the invention is made from sheet metal, preferably stainless steel, and is not provided with internal insulation to protect the metal from the heat of the burning fuel. The internal temperatures of the chamber, under operating conditions, may rise to as high as 1,000° F. Temperatures at different portions of the chamber walls vary due to different conditions. Un-equal temperature conditions result in un-equal expansion of areas of the chamber and may result in deflection of the sheet which interferes with flow of air across the exterior of the chamber walls. To prevent this deflection, the chamber walls may be corrugated. The corrugations 37, as shown in FIG. 7, are disposed outwardly of the main plane of the chamber walls 33. By continuing the corrugations around the bottom wall 32 a uniform exterior surface is provided. At the inner face of the chamber walls, the outwardly extending corrugations permit full contact of the flame with the inner face of the corrugated chamber walls and entrance of combustion flame and gases into the corrugations provides substantially uniform heating of the wall at any given area.

A heat exchanger unit is mounted so as to enclose the upper portion of the combustion chamber in the path of air flowing therepast for further extraction of heat from the combustion gases before discharge thereof into the atmosphere. This unit comprises a closed rectangular housing 38 disposed in transverse spaced relation to combustion chamber end wall 34 and a closed rectangular housing 39 disposed in transverse spaced relation to said chamber end wall 35. Said housings are connected by a plurality of combustion gas conveying tubes 40 disposed in transverse spaced relation to the chamber side walls 33. Said tubes 40 being also arranged in vertically spaced staggered relation to said side walls 33.

As best shown in FIGS. 3, 5 and 6 the housing 38 disposed transversely of the chamber front end wall 34 comprises a rear wall 41, end wall 42, end wall 43, front wall 44, transverse wall 45, front wall 46 and top and bottom walls 47 and 48. The transverse wall 45 divides the housing into two compartments as shown in FIG. 5, each compartment having apertures through the rear wall 41 receiving one end of tubes 40. Rear wall 41 also has an opening 49 therein into which is received one end of a conduit 50. The opposite end of conduit 50 extends through a suitable opening in combustion chamber end wall 34 conducting combustion gases from the chamber into the right hand compartment of housing 38 as shown in FIGS. 2 and 5. Housing front wall 46 extends outwardly from front wall 44, to adjacent the end wall panel 29. Registering openings in wall 46 and panel 29 receive a suitable collar and conduit 51 which may be conveniently mounted on panel 29. To this collar and conduit 51 is suitably secured an exhaust fan housing 52, as best shown in FIG. 4. Within housing 52 is a suitably driven exhaust fan which pulls combustion gases from the combustion chamber through the heat exchanger and exhausts them to a stack 53 connected with the upper end of housing 52.

The heat exchanger housing 39 is of substantially rectangular shape having sidewalls 54 and 55, end walls 56 and top and bottom walls 57. Housing side wall 54 has suitable openings therein to receive the adjacent ends of tubes 40 on opposite sides of the combustion chamber 31. The tubes 40 at one side of the chamber 31 carry combustion gases into housing 39 and the tubes of the opposite side carry combustion gases out of housing 39. Housings 38 and 39, with tubes 40, may be suspended about the combustion chamber 31 by any suitable means. One such means is shown as brackets 58 secured to the housings and to the adjacent frame members 23.

The casing of section 2, as shown in FIGS. 1 and 4 is preferably extended outwardly into alignment with the blower section 1. The front wall of the casing may be provided with suitable door panels 59 and 60 providing access to the space between said doors and walls of section 2. Such space houses a burner control panel indicated generally as 61 having a combustion burner collar opening 61a therein and the exhaust fan housing 52.

Disposed above section 2 is the heated air discharge plenum section 3. Such plenum section may be of any suitable design for the purpose of directing heating air to any desired portions of the area to be heated. Preferably this section is substantially rectangular comprised of any suitable frame members such as 62 and upright corner posts 63. Longitudinally and transversely the frame is divided by posts 64 providing air outlets 65 about the periphery of section 3. Such outlets 65 may be closed by removable plates 66 or have mounted therein pivotally adjustable vertical or horizontal louvers 67 for directing discharge of heated air.

Except as otherwise specifically referred to, the details of construction herein referred to are for purposes of illustration and not limitation, except as required by the scope of the appended claims.

I claim:

1. In a space heater providing forced circulation of heating air therethrough, in combination, a casing having walls defining an air passage of rectangular cross-section, means forming an air inlet at one end of the casing and an air outlet at the opposite end of the casing, blower means providing forced circulation of air through the casing, a closed sheet metal combustion chamber disposed within the casing in spaced relation to the casing walls and the air inlet, said chamber having an arcuate bottom wall, converging connected side walls extending upwardly from said bottom wall and end walls connecting said side and bottom walls, a heat exchanger disposed within said casing and enclosing the upper portion of the said chamber in spaced relation thereto, said heat exchanger comprising combustion gases conveying tubes disposed in spaced relation to each side wall of the said chamber, a closed plenum disposed transversely of the chamber rear end wall and in spaced relation thereto into which the adjacent ends of said tubes are connected, a closed plenum disposed transversely of the chamber front end wall in spaced relation thereto into which the adjacent ends of said tubes are connected and a transverse wall inside said latter plenum adjacent the center of said chamber dividing the plenum into two closed compartments connected respectively to the tubes at opposite sides of the said side wall chamber, means forming an inlet in said casing and adjacent chamber front end wall adjacent said chamber bottom wall for reception of a fuel burner, means forming an outlet opening on said chamber front end wall connecting one of the adjacent plenum compartments with the interior of said combustion chamber, means forming an outlet opening on the other of said plenum compartments for connection with a forced draft stack conveying combustion gases to the atmosphere.

2. The space heater as defined in claim 1, wherein the arcuate bottom wall of the combustion chamber is substantially semi-circular in cross section, and the cross sectional areas of the air passage spaces between said combustion chamber bottom wall and the adjacent casing sidewalls for entering flow of air through said casing being progressively constricted below a plane through said chamber and casing at the diameter of the chamber bottom wall and the air passage spaces between the chamber side wall and casing wall progressively increasing in area above said plane providing greatest air pressure below said plane and causing the expanding air above said plane to uniformly wipe the surface of the chamber side walls at any cross sectional area thereof through the said converging chamber in preventing hot spots in the chamber walls.

3. The space heater as defined in claim 2 wherein the included angle between said chamber converging side walls is about 51 degrees.

4. The space heater as defined in claim 2, wherein the said combustion gases conveying tubes are disposed in a plurality of transversely spaced vertical planes in parallel relation to the chamber side walls and in staggered vertical relation, and the said plenums at each chamber end wall are in spaced relation to the chamber walls.

5. The space heater as defined in claim 4, wherein said chamber side and bottom walls have continuous corrugations therein extending outwardly of the surfaces of the inner faces of said walls and spaced transversely of the chamber between the end walls thereof.

6. In a space heater providing forced circulation of heating air therethrough, in combination, a casing having walls defining an air passage of rectangular cross-section throughout the length of the casing, means forming an air outlet in the top wall of the casing and an air inlet in the bottom wall of the casing, blower means providing forced circulation of air through said casing inlet and outlet, a closed sheet metal combustion chamber disposed within said casing in spaced relation to each of the casing walls and to the air inlet thereof and over which air flows in extracting heat from said chamber during passage through said casing, said chamber having a substantially semi-cylindrical bottom wall disposed in the path of air entering through said casing inlet, connected casing side walls converging upwardly from said chamber bottom wall to adjacent the casing outlet and end walls connecting the chamber bottom and side walls, the cross-sectional areas of the air passages between the combustion chamber bottom wall and the adjacent casing side walls for entering flow of air through said casing being progressively constricted below the plane of juncture between the chamber side walls and bottom wall and the cross-sectional area of the spaces between said chamber side walls and the casing side walls progressively increasing above said plane causing the expanding air above said plane to progressively wipe the surfaces of said chamber side walls at any cross-sectional area through the chamber, said chamber front end wall having an opening therein adjacent the bottom of said chamber for admission of burning fuel, a heat exchanger disposed within said casing and enclosing a portion of the upper end of said chamber in spaced relation thereto, said heat exchanger comprising combustion gases conveying tubes disposed in spaced relation to each side wall of said chamber, a closed plenum disposed transversely of said chamber rear end wall and in spaced relation thereto into which the adjacent ends of said tubes are connected, a closed plenum disposed transversely of the chamber front end wall in spaced relation thereto into which the adjacent ends of said tubes are connected, a transverse wall inside said latter plenum adjacent the center of the chamber dividing the plenum into two closed compartments connected respectively to the tubes at opposite sides of said chamber side walls, a conduit extending through the adjacent chamber front wall and adjacent plenum chamber wall conducting combustion gases from the combustion chamber into the plenum chamber, and means forming an outlet opening in the other of said adjacent plenum compartments for connection with a forced draft stack conveying the combustion gases from the heat exchanger to the atmosphere.

7. The space heater as defined in claim 6 wherein the said combustion gases conveying tubes are disposed in a plurality of vertically spaced transverse planes in parallel relation to the chamber side walls and in staggered vertical relation, and the said plenums at each chamber end wall are in spaced relation to the casing walls.

References Cited in the file of this patent

UNITED STATES PATENTS

| | | |
|---|---|---|
| 616,844 | Howard | Dec. 27, 1898 |
| 1,013,304 | Noble | Jan. 2, 1912 |
| 1,018,967 | Frost | Feb. 27, 1912 |
| 1,907,049 | Diggins | May 2, 1933 |
| 2,037,070 | Frentzel | Apr. 14, 1936 |
| 2,172,667 | Nelson | Sept. 12, 1939 |
| 2,404,592 | Olson | July 23, 1946 |
| 2,512,384 | Rush | June 20, 1950 |
| 2,529,574 | Rush | Nov. 14, 1950 |
| 2,715,399 | Witt et al. | Aug. 16, 1955 |
| 2,800,126 | Costello et al. | July 23, 1957 |
| 2,836,169 | Reilly | May 27, 1958 |